(12) United States Patent
Barry et al.

(10) Patent No.: US 7,237,088 B2
(45) Date of Patent: Jun. 26, 2007

(54) METHODS AND APPARATUS FOR PROVIDING CONTEXT SWITCHING BETWEEN SOFTWARE TASKS WITH RECONFIGURABLE CONTROL

(75) Inventors: Edwin Franklin Barry, Vilas, NC (US); Gerald George Pechanek, Cary, NC (US); David Strube, Raleigh, NC (US)

(73) Assignee: Altera Corporation, San Jose, CA (US)

( * ) Notice: Subject to any disclaimer, the term of this patent is extended or adjusted under 35 U.S.C. 154(b) by 280 days.

(21) Appl. No.: 10/761,564

(22) Filed: Jan. 21, 2004

(65) Prior Publication Data

US 2004/0153634 A1   Aug. 5, 2004

Related U.S. Application Data

(63) Continuation of application No. 09/598,558, filed on Jun. 21, 2000, now Pat. No. 6,868,490.

(60) Provisional application No. 60/140,244, filed on Jun. 21, 1999.

(51) Int. Cl.
G06F 15/80 (2006.01)
(52) U.S. Cl. ......................... 712/15; 712/229
(58) Field of Classification Search .................. 712/10, 712/11, 15, 228, 229
See application file for complete search history.

(56) References Cited

U.S. PATENT DOCUMENTS

| | | | | | |
|---|---|---|---|---|---|
| 4,135,247 A | * | 1/1979 | Gordon et al. | ................ | 378/11 |
| 4,763,242 A | * | 8/1988 | Lee et al. | ...................... | 703/27 |
| 5,542,074 A | * | 7/1996 | Kim et al. | ..................... | 712/22 |
| 5,574,939 A | * | 11/1996 | Keckler et al. | ............... | 712/24 |
| 5,890,008 A | * | 3/1999 | Panwar et al. | ................. | 712/15 |
| 6,088,510 A | * | 7/2000 | Sims | ............................ | 706/13 |
| 6,128,728 A | * | 10/2000 | Dowling | ..................... | 712/228 |
| 6,327,650 B1 | * | 12/2001 | Bapst et al. | ................ | 712/228 |

* cited by examiner

Primary Examiner—Eddie Chan
Assistant Examiner—David J. Huisman
(74) Attorney, Agent, or Firm—Priest & Goldstein, PLLC

(57) ABSTRACT

The ManArray core indirect VLIW processor consists of an array controller sequence processor (SP) merged with a processing element (PE0) closely coupling the SP with the PE array and providing the capability to share execution units between the SP and PE0. Consequently, in the merged SP/PE0 a single set of execution units are coupled with two independent register files. To make efficient use of the SP and PE resources, the ManArray architecture specifies a bit in the instruction format, the SP/PE-bit, to differentiate SP instructions from PE instructions. Multiple register contexts are obtained in the ManArray processor by controlling how the array SP/PE-bit in the ManArray instruction format is used in conjunction with a context switch bit (CSB) for the context selection of the PE register file or the SP register file. In arrays consisting of more than a single PE, the software controllable context switch mechanism is used to reconfigure the array to take advantage of the multiple context support the merged SP/PE provides. For example, a 1×1 can be configured as a 1×1 with context-0 and as a 1×0 with context-1, a 1×2 can be configured as a 1×2 with context-0 and as a 1×1 with context-1, and a 1×5 can be configured as a 1×5 with context-0 and as a 2×2 with context-1. Other array configurations are clearly possible using the present techniques. In the 1×5/2×2 case, the two contexts could be a 1×5 array (context-0) and a 2×2 array (context-1).

15 Claims, 6 Drawing Sheets

| SP/PE | MANARRAY ARCHITECTURE INSTRUCTION TYPE | | |
|---|---|---|---|
| 0 | SP ONLY INSTRUCTION | | |
| 1 | PE ONLY INSTRUCTION | | |

310

300

| | PHYSICAL MxN | CSB | SP/PE | OPERATING MxN | COMMENTS |
|---|---|---|---|---|---|
| 320 | 1x1 | 0 | 0 | 1x1 | SP INSTRUCTIONS USE ONLY THE SP's CONTEXT-0 REGISTER FILES |
| 322 | 1x1 | 0 | 1 | 1x1 | PE INSTRUCTIONS USE ONLY THE PE0's REGISTER FILES |
| 324 | 1x1 | 1 | 0 | 1x0 | SP INSTRUCTIONS USE ONLY THE PE0's CONTEXT-1 REGISTER FILES |
| 326 | 1x1 | 1 | 1 | 1x0 | PE INSTRUCTIONS TYPICALLY NOT USED |
| 330 | 1x2 | 0 | 0 | 1x2 | SP INSTRUCTIONS USE ONLY THE SP's CONTEXT-0 REGISTER FILES |
| 332 | 1x2 | 0 | 1 | 1x2 | PE INSTRUCTIONS USE ONLY THE PE0's AND PE1's REGISTER FILES |
| 334 | 1x2 | 1 | 0 | 1x1 | SP INSTRUCTIONS USE ONLY THE PE0's CONTEXT-1 REGISTER FILES |
| 336 | 1x2 | 1 | 1 | 1x1 | PE INSTRUCTIONS USE ONLY THE PE1's REGISTER FILES |
| 340 | 1x5 | 0 | 0 | 1x5 | SP INSTRUCTIONS USE ONLY THE SP's CONTEXT-0 REGISTER FILES |
| 342 | 1x5 | 0 | 1 | 1x5 | PE INSTRUCTIONS USE ONLY THE PE0-4's REGISTER FILES |
| 344 | 1x5 | 1 | 0 | 2x2 | SP INSTRUCTIONS USE ONLY THE PE0's CONTEXT-1 REGISTER FILES |
| 346 | 1x5 | 1 | 1 | 2x2 | PE INSTRUCTIONS USE ONLY THE PE1-4's REGISTER FILES |

| SP/PE | ManArray Architecture Instruction Type |
|---|---|
| 0 | SP ONLY INSTRUCTION |
| 1 | PE ONLY INSTRUCTION |

— 310

— 300

| | PHYSICAL MxN | CSB | S/P/PE | OPERATING MxN | COMMENTS |
|---|---|---|---|---|---|
| 304 | | | | | |
| 320 | 1x1 | 0 | 0 | 1x1 | SP INSTRUCTIONS USE ONLY THE SP's CONTEXT-0 REGISTER FILES |
| 322 | 1x1 | 0 | 1 | 1x1 | PE INSTRUCTIONS USE ONLY THE PE0's REGISTER FILES |
| 324 | 1x1 | 1 | 0 | 1x0 | SP INSTRUCTIONS USE ONLY THE PE0's CONTEXT-1 REGISTER FILES |
| 326 | 1x1 | 1 | 1 | 1x0 | PE INSTRUCTIONS TYPICALLY NOT USED |
| 330 | 1x2 | 0 | 0 | 1x2 | SP INSTRUCTIONS USE ONLY THE SP's CONTEXT-0 REGISTER FILES |
| 332 | 1x2 | 0 | 1 | 1x2 | PE INSTRUCTIONS USE ONLY THE PE0's AND PE1's REGISTER FILES |
| 334 | 1x2 | 1 | 0 | 1x1 | SP INSTRUCTIONS USE ONLY THE PE0's CONTEXT-1 REGISTER FILES |
| 336 | 1x2 | 1 | 1 | 1x1 | PE INSTRUCTIONS USE ONLY THE PE1's REGISTER FILES |
| 340 | 1x5 | 0 | 0 | 1x5 | SP INSTRUCTIONS USE ONLY THE SP's CONTEXT-0 REGISTER FILES |
| 342 | 1x5 | 0 | 1 | 1x5 | PE INSTRUCTIONS USE ONLY THE PE0-4's REGISTER FILES |
| 344 | 1x5 | 1 | 0 | 2x2 | SP INSTRUCTIONS USE ONLY THE PE0's CONTEXT-1 REGISTER FILES |
| 346 | 1x5 | 1 | 1 | 2x2 | PE INSTRUCTIONS USE ONLY THE PE1-4's REGISTER FILES |

— 312

METHODS AND APPARATUS FOR PROVIDING CONTEXT SWITCHING BETWEEN SOFTWARE TASKS WITH RECONFIGURABLE CONTROL

RELATED APPLICATIONS

The present application is a continuation of U.S. Ser. No. 09/598,558 filed Jun. 21, 2000 and now U.S. Pat. No. 6,868,490 claims the benefit of U.S. Provisional Application Ser. No. 60/140,244 filed Jun. 21, 1999 which are incorporated by reference herein in their entirety.

FIELD OF INVENTION

The present invention relates generally to improvements in the manifold array (ManArray) architecture, and more particularly to advantageous methods and apparatus for providing efficient context switching between tasks in a ManArray processor environment, and advantageous methods and apparatus for array reconfiguration.

BACKGROUND OF THE INVENTION

Members of the ManArray family of core processors are created by appropriately combining a number of basic building blocks. One of these building blocks is a unit that combines an array controller sequence processor (SP) with a processing element (PE). Another building block is a single PE. These building block elements are interconnected by the ManArray network and DMA subsystem to form different size array systems. By embedding an array operating mode bit, that controls the SP or PE execution, and communication instructions, that operate on the scalable high performance integrated interconnection network, in the instruction set architecture, a scalable family of array cores, such as 1×1, 1×2, 2×2, 2×4, 4×4, and the like is produced. For example, a 1×1 ManArray core processor may suitably comprise a single set of execution units coupled with two independent compute register files. The processor's register files consist of a reconfigurable compute register file (CRF), providing either a 32×32-bit or 16×64-bit file configurations, an address register file (ARF) containing eight 32-bit registers and a set of status and control registers located in a miscellaneous register file (MRF) and special purpose registers (SPRs). The ManArray instruction set supports processor scalability in part through the use of an SP/PE bit (S/P-bit) contained in the ManArray instruction format. For array structures, this bit distinguishes whether the SP or the set of attached PEs will execute a particular instruction, though it is noted that some instructions actually are executed cooperatively by both the SP and PEs. By "execute an instruction", we mean that one or more processor registers or memories are updated based on the operation semantics.

In many applications, such as real time systems, multiple processes may have operating requirements with servicing deadlines that can only be met by sharing a processor on multiple independent tasks. Each task represents a context that is made up of the task's program, data, and machine state. To meet the deadlines imposed by the different processes, a real time operating system (OS) is typically used to manage when a task, from a set of multiple tasks, is to be executed on the processor. This real time OS can cause a context switch which may require the saving of the complete machine state for an existing context prior to loading the next context in the processor. Consequently, it is important to have a short context switching time in real time systems.

SUMMARY OF THE INVENTION

The merged SP/PE0 building block unit logically functions as a single context controller and by virtue of the merged PE provides supporting interfaces that allow additional PEs to be attached. In this single context controller environment, the SP/PE-bit is used to determine whether an instruction is to be executed in the SP only or is to be executed in the PE array. In one aspect of the present invention, the SP/PE-bit is used in a 1×1 array core to determine which register file, the SP's or the PE's, is to be accessed for each instruction execution. By treating the SP/PE-bit as a context-0/context-1 bit, the selection between two different register spaces effectively doubles the size of the register space for the SP. Thus, the 1×1 array core can be viewed as a single processor containing two register contexts that share a common set of execution units.

Note that this approach of using the SP/PE-bit for context switching purposes requires that for an instruction to access the PE register space, it must set the SP/PE bit in the instruction word to indicate it is a PE instruction. The implication of this requirement is that different forms of instructions are required to be used for accessing different registers. If it is desired to make use of both register files in a 1×1, for different contexts for example, the code must be explicitly targeted by using either PE or SP instructions. This limitation does not allow for seamless context switching between tasks since the task code is not uniform. As addressed further below, the present invention advantageously addresses these and other limitations providing improved context switch control.

Multiple register contexts are obtained in the ManArray processor by controlling how the array SP/PE-bit in the ManArray instruction format is used in conjunction with a context switch bit (CSB) for the context selection of the PE register file or the SP register file. In arrays consisting of more than a single PE, the software controllable context switch mechanism is used to reconfigure the array to take advantage of the multiple context support the merged SP/PE provides. For example, a 1×1 can be configured as a 1×1 with context-0 and as a 1×0 with context-1, a 1×2 can be configured as a 1×2 with context-0 and as a 1×1 with context-1, and a 1×5 can be configured as a 1×5 with context-0 and as a 2×2 with context-1. Other array configurations are clearly possible using the present invention. In the 1×5/2×2 case, the two contexts could be a 1×5 with the sequential control context in the SP register files with context-0 and a 2×2 array context, where the sequential control context uses the PE0's register files with context-1.

These and other features, aspects and advantages of the invention will be apparent to those skilled in the art from the following detailed description taken together with the accompanying drawings.

BRIEF DESCRIPTION OF THE DRAWINGS

FIG. 3 specifies the logical operation of various array configurations for different settings of the CSB and the instruction's SP/PE-bit;

DETAILED DESCRIPTION

Figure 1:
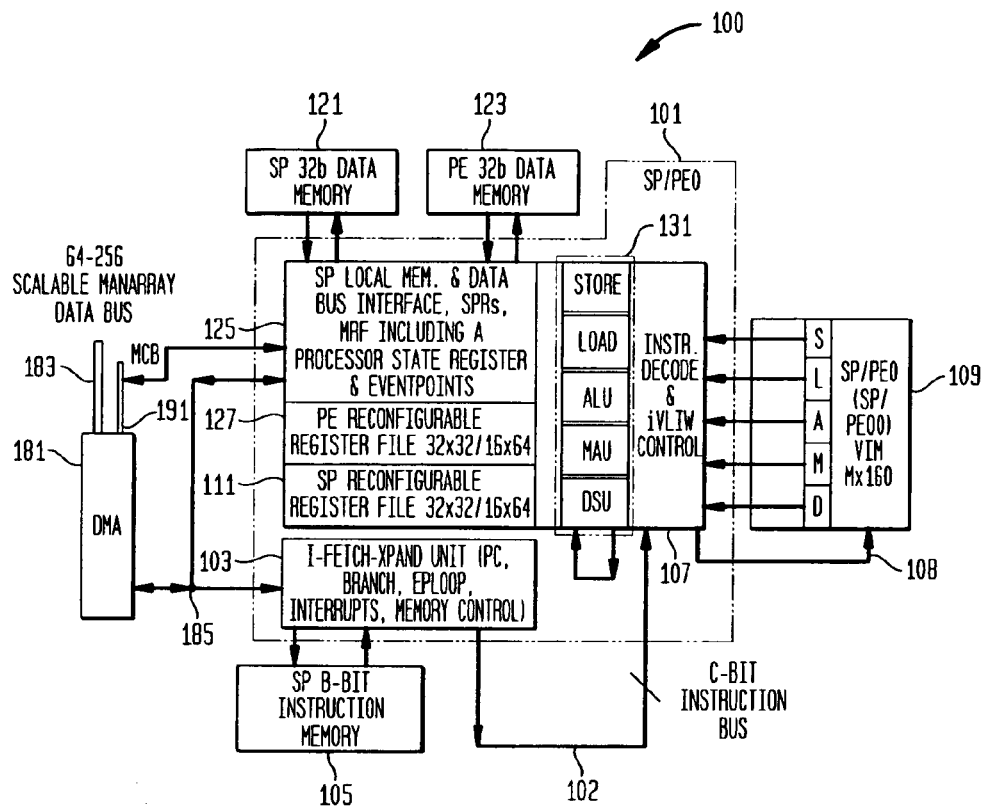
FIG. 1 illustrates an exemplary 1×1 ManArray two context core operable in a first context as a 1×1 and in a second context as a 1×0 SP ManArray iVLIW processor in accordance with the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,588 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent Application Ser. No. 09/596,103 entitled "Methods and Apparatus for Data Dependent Address Operations and Efficient Variable Length Code Decoding in a VLIW Processor" filed Jun. 16, 2000, U.S. patent Application Ser. No. 09/598,566 entitled "Methods and Apparatus for Generalized Event Detection and Action Specification in a Processor" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, and Provisional Application Ser. No. 60/203,629 entitled "Methods and Apparatus for Power Control in a Scalable Array of Processor Elements" filed May 12, 2000, respectively, all of which are assigned to the assignee of the present invention and incorporated by reference herein in their entirety.

In a presently preferred embodiment of the present invention, a ManArray 1×1 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element".

The SP/PE0 101 contains a fetch controller 103 to allow the fetching of short instruction words (SIWs) from a B=32-bit instruction memory 105. The fetch controller 103 provides the typical functions needed in a programmable processor such as a program counter (PC), branch capability, digital signal processing, eventpoint (EP) loop operations, support for interrupts, and also provides instruction memory management control which could include an instruction cache if needed by an application. In addition, the SIW I-Fetch controller 103 dispatches 32-bit SIWs to the other PEs that may be attached in an array, and PE0, in the case of the processor 100 of FIG. 1. The 32-bit SIWs are dispatched utilizing a 32-bit instruction bus 102.

Figure 4:
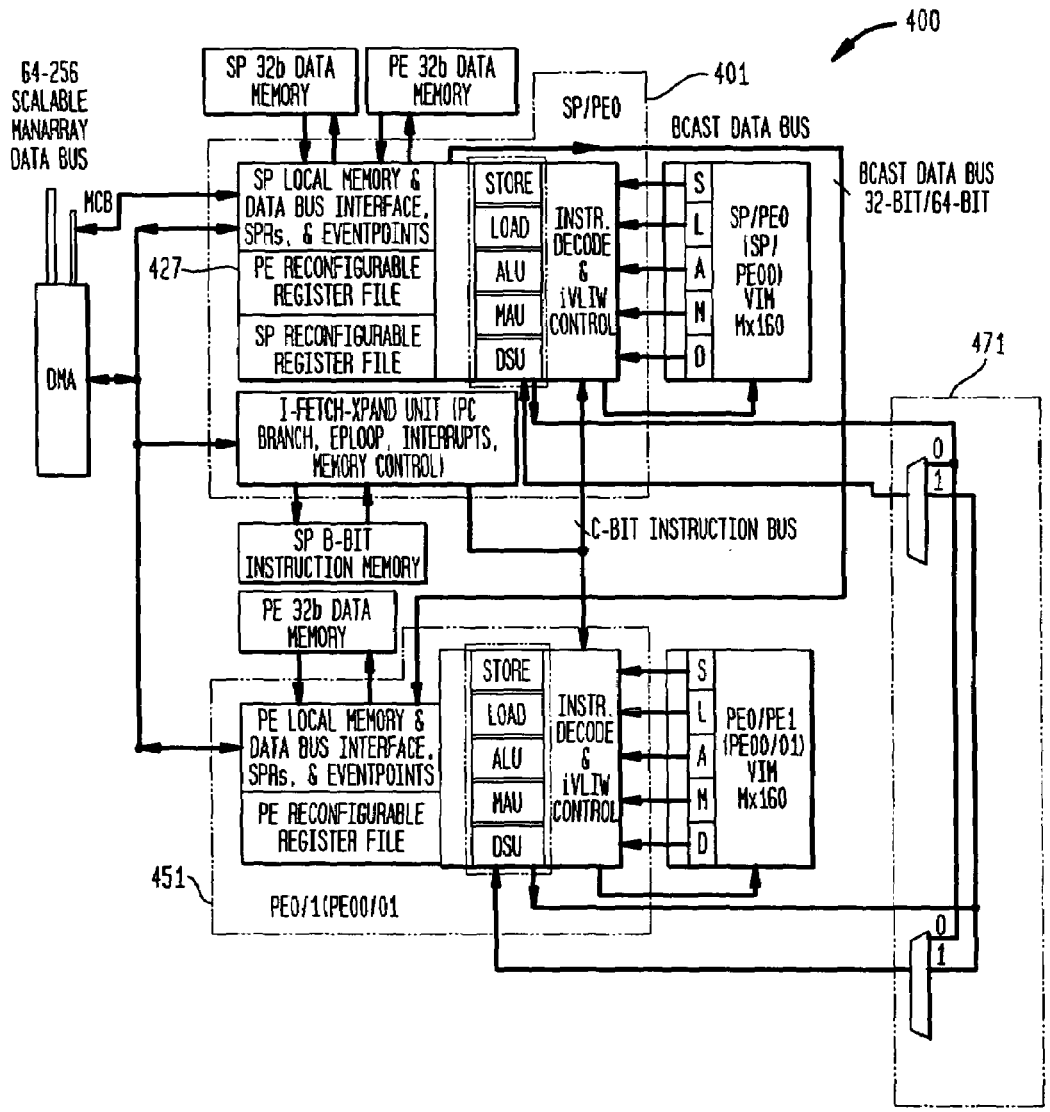
FIG. 4 illustrates an exemplary 1×2 two context ManArray processor configurable as a 1×2 in context-0 and as a 1×1 in context-1.

In this exemplary system 100, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as any other PE that could be attached can be optimized for a floating point application. For the purposes of this description, it is assumed that the execution units 131 are of the same type in the SP/PE0 and in the additional PE or PEs, such as PE1 of FIG. 4 or PEs 1, 2 or 3 of FIG. 5. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 is an SP reconfigurable register file 111 and a PE reconfigurable register file 127 which is described in further detail in U.S. patent application Ser. No. 09/169, 255 entitled "Methods and Apparatus for Dynamic Instruction Controlled Reconfiguration Register File with Extended Precision".

Due to the combined nature of the SP/PE0 101, the data memory interface controller 125 must handle the data processing needs of both the SP controller, with SP data in memory 121, and PE0, with PE0 data in memory 123. The data memory interface controller 125 also provides a broadcast data bus interface (not shown in FIG. 1 as this Figure shows a single PE core) to attached PEs, special purpose registers (SPRs), and support for the ManArray eventpoint architecture. Any other PEs would contain their own physical data memory units, though the data stored in them is generally different as required by the local processing done on each PE. The local interface to these PE data memories is also a common design in any other attached PE. The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown.

Figure 2:
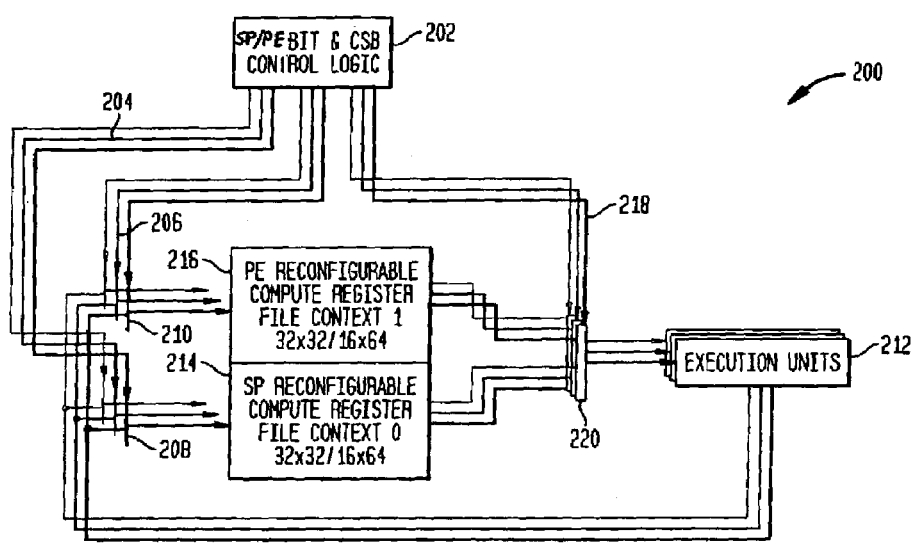
FIG. 2 provides a high-level view of the basic function of the SP/PE-bit and context switch bit (CSB) for improved context switch control in accordance with the present invention.

To provide for efficient context switching within a ManArray processor, a processor mode bit is provided in a control register such as a processor state register in a miscellaneous register file (MRF). This bit is identified as a context switch bit (CSB). FIG. 2 illustrates a functional view of a system 200 for implementing the present invention. An SP/PE-bit and CSB bit control logic unit 202 contains the CSB and override logic. The control logic unit 202 provides enable signals 204 and 206 to multiplexers 208 and 210, respectively, to select where the result data from the execution units 212 are to be written. The result data is selectably written either to the SP reconfigurable register compute register file 214 or to the PE reconfigurable compute register file 216. The control logic unit 202 also provides a select signal 218 to a multiplexer 220 to control which block of registers 214 or 216 that execution units 212 read data from. It is noted that in FIG. 2, the execution units 212 in the ManArray iVLIW processor may advantageously comprise five heterogeneous execution units which correspond to the five execution units 131 in FIG. 1. Also, the buses, multiplexers, and select control signals shown in FIG. 2 are indicated with multiple lines since in the ManArray processor such as shown in FIG. 1 there are eight 32-bit read ports and four 32-bit write ports for each 16×32-bit portion of both of the reconfigurable register files and each requires separate selection and control depending upon the instruction in execution and the machine state.

Specifically, the CSB bit in conjunction with the SP/PE-bit in PE0's control logic allows efficient context switching between tasks. Control specification 300 of FIG. 3 lists three exemplary array configurations and describes the register file use and array operating configuration for SP or PE instructions, as specified by the instruction's SP/PE-bit, depending upon the setting of the CSB bit. Table 310 indicates the ManArray architecture definition of the SP/PE-bit, which is present in the execution units' instruction formats. In general, other register files including the reconfigurable compute register files are shared between contexts. Specifically, in FIG. 3, the register files that are indicated to be shared are the address register file (ARF), the compute register file (CRF), and selected MRF and special purpose registers (SPRs) used by the execution units. The physical M×N column 304 indicates the physical array organization of PEs in the core processor, while the operating M×N column 312 depends upon the CSB value. It is noted that with the CSB bit set to zero, as seen in control specification entries 320, 322, 330, 332, 340, and 342, the SP operates in context-0 with SP instructions only executing in the SP on SP resources and PE instructions only executing in any or all of the PEs on PE resources. With the CSB bit set to a one, as seen in control specification entries 324, 326, 334, 336, 344, and 346, the SP operates in context-1 which uses the PE0's register files. As described by this invention, each M×N core is a two context processor where one of the contexts uses SP-only resources for sequential control while the other context uses PE0's resources for sequential control.

By controlling the CSB-bit, an operating system (OS) can select a "context" for a task. In the 1×1 case, entries 320–326, where no PE instructions are used in a program, the core processor acts as a 1×0 with two contexts that the OS can freely assign as required by an application. In this 1×1 case, use of the CSB bit, rather than dependence on the SP/PE-bit only, allows the task code to be written in a uniform manner when using only the SP forms of instructions. Using PE instructions on PE0 even when the CSB bit is set to a 1, entry 326, is not likely an advantage, but can be optionally allowed effectively sharing PE0's context-1 register files between the SP and PE0.

The two other cases addressed herein, by way of example, namely a 1×2 and a 1×5, provide array reconfiguration dependent upon the context in operation. For example, in 1×2 system 400 of FIG. 4, the physical configuration of the processor is a merged SP/PE0 401 with an additional PE 451. With the CSB-bit set to a zero, inactive level, the core processor functions as a 1×2 as indicated by entries 330 and 332 in FIG. 3. When the CSB-bit is set active, then the SP takes over the use of PE0's register files 427, and other inferred files, as the second context. It is noted that for these configurations no SP instructions can be mixed with PE instructions in the physical PE0 since the register files are being used for program context switching purposes. When the SP is using PE0's register file resources as context-1, the additional PE is still available for use. Consequently, the operating configuration switches from a 1×2 to a 1×1 in the second context. To allow the array, the single additional PE in this case, to function properly in PE identity (ID) dependent operations, such as for control of cluster switch 471, the additional PE switches to a virtual identity as PE0 when the CSB-bit is active. For example, the SPRECV instructions specify which PE is to send a source register to the cluster switch and identify in the SP/PE0 from which PE# the data is to be received from. For code written for a 1×1, the SPRECV instruction, if used, would specify PE0 to receive data from. For this operation to happen correctly in the physical 1×2 reconfigured as a 1×1, the physical PE1 switches to a virtual identity of PE0 and responds to the SPRECV 1×1_PE0 instruction.

Figure 5A:
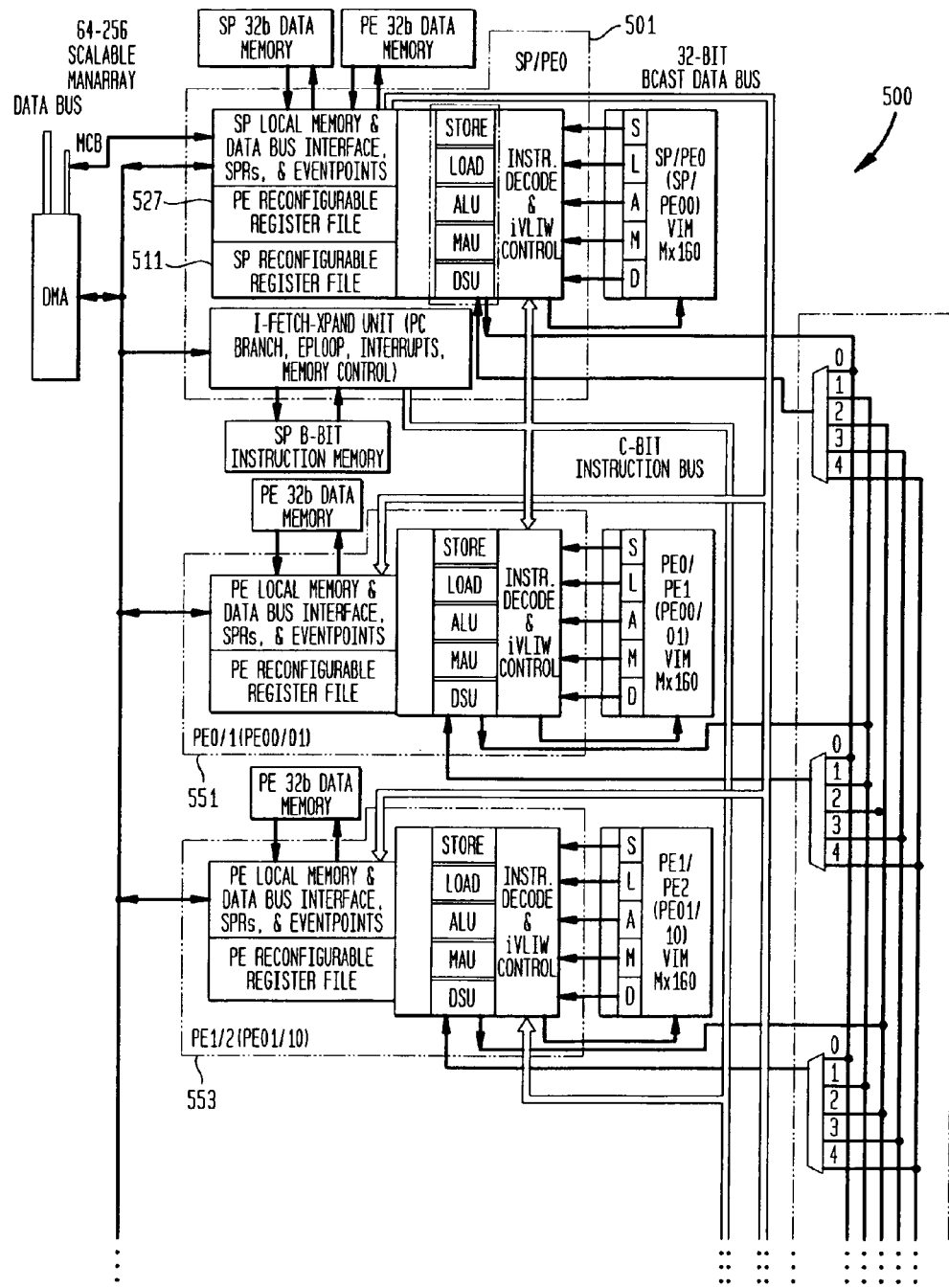
FIGS. 5A and 5B illustrate illustrates an exemplary 1×5 two context ManArray processor configurable as a 1×5 in context-0 and as a 2×2 in context-1.
Figure 5B:
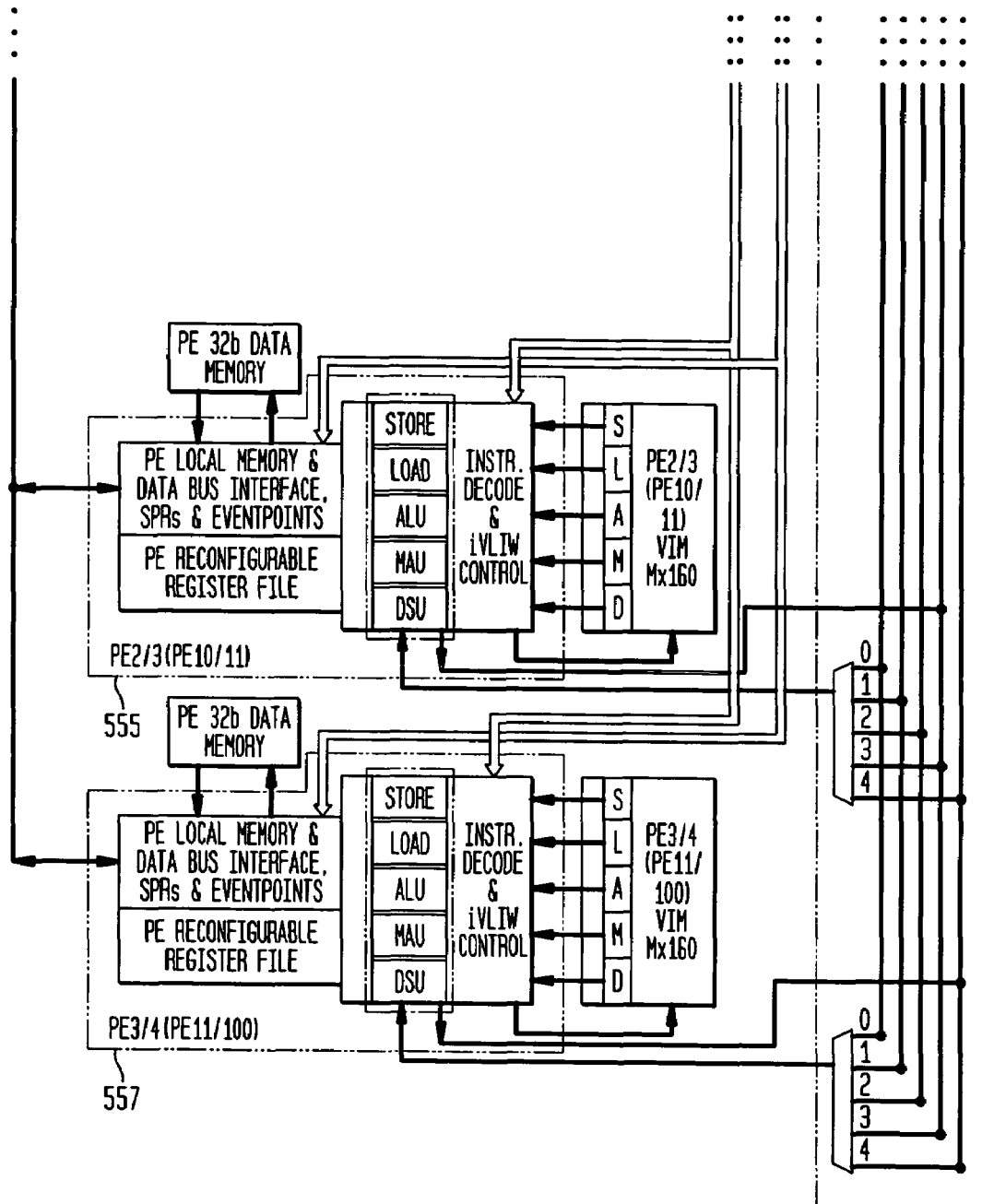

This approach may also be used on larger arrays, such as 1×5 ManArray processor 500 shown in FIG. 5 having four additional PEs 551, 553, 555, and 557 in addition to PE0 which is part of SP/PE0 501. FIG. 5 uses the following notation for the PEs: PE virtual ID/physical ID. In processor 500 of FIG. 5, there are five physical PEs which operate as a 1×5 with the SP using the SP register files 511 as context-0 when the CSB bit is inactive. When the CSB bit is active, the PE array reconfigures itself into a 2×2 with the SP taking over PE0's register files 527, and other inferred files, for context-1. Each of the PEs switches to a virtual identity such that code written for a 2×2 PE array functions correctly on the reconfigured organization. Each PE supports the decode function for the two identified PEs. For example, PE 2/3 555 responds as PE3, its physical ID, when the CSB bit is inactive and responds as PE2, its virtual ID, when the CSB bit is active. The concepts of virtual PEs and cluster switch control is covered in further detail in U.S. application Ser. No. 09/169,256 entitled "Methods and Apparatus for ManArray PE-PE Switch Control". Note that the cluster switch is extended to support five PEs in FIG. 5 which is allowed by the general form of the ManArray interconnection network and covered in additional detail in U.S. Pat. No. 6,023,753 entitled "Manifold Array Processor" and U.S. Application Ser. No. 08/949,122 entitled "Methods and Apparatus for Manifold Array Processing", both of which are incorporated herein by reference in their entirety.

It is noted that when the SP uses the PE0 resources as specified by a context switch, some SP registers can remain SP-only regardless of the setting of the CSB to minimize implementation costs. These register addresses map to resources which are shared between any context such as interrupt control/status registers, cycle count registers, mode control registers, etc.

To further support the context switch mechanism and provide support for multiple contexts, an additional mechanism is added to allow one of the register files to be saved and restored from memory in the background while a task is using another register file referred to as the foreground register file. One mechanism used for this takes advantage of unused load and store unit instruction slots to perform this context switch save and restore operation. Essentially, "background" store and load instructions, together with a means of indexing through a register file, are activated whenever a task is not executing a foreground load or store instruction. A pair of background address registers is required to provide the store and load addresses for the register context switch. The "background" store and load instructions are pre-stored context switch save and restore instructions which, when enabled, operate in the background until the save and restore operation has completed. Use of the eventpoint architecture is one mechanism that can be set up to test for the lack of foreground store and load instruction execution and trigger a background store and load instruction to execute. Suitable eventpoint architecture is covered in more detail in U.S. Provisional Application Ser. No. 60/140,245 entitled "Methods and Apparatus for Generalized Event Detection and Action Specification in a Processor" and U.S. application Ser. No. 09/598,566 having the same title and filed Jun. 21, 2000, both of which are incorporated by reference herein in their entirety. A status bit is also used to indicate the progress of the context switch so that, if preempted, it could be allowed to complete before another program context was initiated. Further details of a presently preferred register file indexing mechanism are provided in U.S. patent application Ser. No. 09/267,570 entitled "Register File Indexing Methods and Apparatus for Providing Indirect Control of Register Addressing in a VLIW Processor" filed Mar. 12, 1999 and incorporated by reference herein in its entirety. This register file indexing mechanism is preferably used for register file access.

Using the above background save and restore mechanisms, an OS could support two task context in registers at any given time and provide the ability to switch contexts in one set of registers while executing from the other. The register-based task contexts would allow for very low-overhead context switching.

While the present invention is disclosed in the context of a presently preferred embodiment, it will be recognized that a wide variety of implementations may be employed by persons of ordinary skill in the art consistent with the above discussion and the claims which follow below.

We claim:
1. An array processor comprising:
   a physical M×N array organization of at least two processing elements (PEs) and a sequence processor (SP), each of the at least two PEs having a set of PE register files and the SP having a set of SP register files, the SP and at least one PE combined to form a combined processor, the combined processor having substantially similar access to the set of SP register files and to the set of PE register files of the at least one PE that was combined to form the combined processor; and
   a processor state register storing a context switch bit (CSB), the CSB having a first state and a second state, the SP and each PE operating to detect the state of the CSB,
   the combined processor upon detection of the first state of the CSB operating in a first operating context stored in the set SP register files, the first operating context adapted for processing a first software task where the first software task is written for an M×N operating configuration which matches the physical M×N array organization including the at least one PE of the combined processor, where M represents the number of rows of PEs and N represents the number of columns of PEs,
   the combined processor upon detection of the second state of the CSB operating in a second operating context stored in the set of PE register files of the combined processor, the second operating context adapted for a second software task where the second software task is written for an O×P operating configuration of the physical M×N array organization where O is the number of rows of PEs and P is the number of columns of PEs, the O×P operating configuration not matching the physical M×N array organization as O+P<M+N.
2. The array processor of claim 1 further comprising:
   an eventpoint mechanism to trigger a context switch from the O×P operating configuration to the M×N operating configuration by storing the data contents of the set of PE register files of the combined processor and the PEs in the background while the first software task uses the set of SP register files in the foreground, whereby the O×P operating configuration is saved.

3. The array processor of claim 1 further comprising:
an eventpoint mechanism to trigger a context switch from the M×N operating configuration to the O×P operating configuration by loading the set of PE register files of the combined processor and the PEs in the background with the data contents associated with the O×P operating configuration and after all of the data contents have-been loaded, the combined processor switches to the second software task.

4. The array processor of claim 1 wherein each processing element of the at least two processing elements has a physical identifier and a virtual identifier, wherein during the processing of the first software task, instructions are operable in each processing element according to its physical identifier, wherein during the processing of the second software task, instructions are operable in each processing element according to its virtual identifier taking into account the at least one FE that was combined to form the combined processor.

5. A method for providing reconfiguration of a first array processor having a physical M×N array organization to emulate operation of a second array processor having a physical O×P array organization where M and O represent the number of rows of processing elements (PEs) and N and P represent the number of columns of PEs, the method comprising:
providing the first array processor having at least two PEs arranged in the physical M×N array organization and having a sequence processor (SP), each of the at least two PEs having a set of FE register files and the SP having a set SP register files;
combining the SP and at least one PE to form a combined processor, the combined processor having substantially similar access to the set of SP register files and to the set of PE register files of the at least one PE that was combined to form the combined processor;
storing a context switch bit (CSB), the CSB having a first state and a second state;
detecting the state of the CSB;
upon detection of the first state, operating in a first operating context stored in the set of SP register files, the first operating context adapted for processing a first software task, wherein the first software task is written for an M×N operating configuration which matches the physical M×N array organization including the at least one PE of the combined processor; and
upon detection of the second state, operating in a second operating context stored in the set of PE register files of the combined processor, the second operating context adapted for processing a second software task, wherein the second software task is written for an O×P operating configuration on an O×P subset of the physical M×N array organization, where either M≠O or N≠P.

6. The method of claim 5 wherein the operating in the second operating context step further comprises:
setting the CSB to the first state; and
returning the processing to the first operating context.

7. The method of claim 5 wherein the physical M×N array organization comprises a 1×1 layout and the emulated physical O×P array organization comprises a 1×0 layout, wherein the 1×0 layout defines the sequence processor (SP) executing sequential instructions.

8. The method of claim 5 wherein the physical M×N array organization comprises a 1×2 layout and the emulated physical O×P array organization comprises a 1×1 layout.

9. The method of claim 5 wherein the physical M×N array organization comprises a 1×5 layout and the emulated physical O×P array organization comprises a 2×2 layout.

10. An apparatus for providing efficient sharing of programming resources in a merged very long instruction word (VLIW) sequence processor (SP) and VLIW processor element (PE) processor, the merged VLIW SP/PE processor operating to configure an array processor to operate in an M×N operating configuration or in an O×P operating configuration, where M and O are the number of rows of processing elements and N and P are the number of columns of processing elements, and where O+P<M+N, the apparatus comprising:
an SP resource file having a first set of registers;
a PE resource file having a second set of registers;
an input for receiving a VLIW presented for execution, the VLIW having at least two instructions, each instruction encoded with a different setting of an SP/PE-bit, wherein the state of the SP/PE-bit determines whether an instruction is an SP instruction or a PE instruction; and
a processor state register storing a context switch bit (CSB), the merged VLIW SP/PE processor reading the values of the CSB and the SP/PE-bit of each instruction, the value of the CSB selecting the M×N operating configuration or the O×P operating configuration when processing each instruction, the M×N operating configuration adapted for accessing at least one register from the first set of registers when processing an SP instruction as one of the at least two instructions and for accessing at least one register from the second set of registers when processing a PE instruction as the other instruction of the at least two instructions based on the value of the SP/PE-bit.

11. The apparatus of claim 10 wherein the O×P operating configuration is adapted for accessing at least one register from the second set of registers when processing an SP instruction and accessing at least one register from the second set of registers when processing a PE instruction based on the value of the SP/PE-bit.

12. The apparatus of claim 10 wherein the SP resource file is an SP register file, an SP address register file, or an SP machine state register file.

13. The apparatus of claim 10 wherein the PE resource file is a PE register file, PE address register file, or a PE machine state register file.

14. The apparatus of claim 10 further comprising:
at least two execution units associated with the at least two instructions in the VLIW; and
a plurality of multiplexers connected to the SP and PE resource files for selecting resource files from which the at least two execution units read data and to which the at least two execution units write data, a portion of the plurality of multiplexers associated with an execution unit controlled by a logical combination of the SP/PE bit and the CSB.

15. The apparatus of claim 10 wherein the VLIW SP processor and VLIW PE processor are indirect VLIW processors.

* * * * *